June 2, 1931. J. LEDWINKA 1,808,502
CHASSIS CONSTRUCTION
Filed June 29 1928
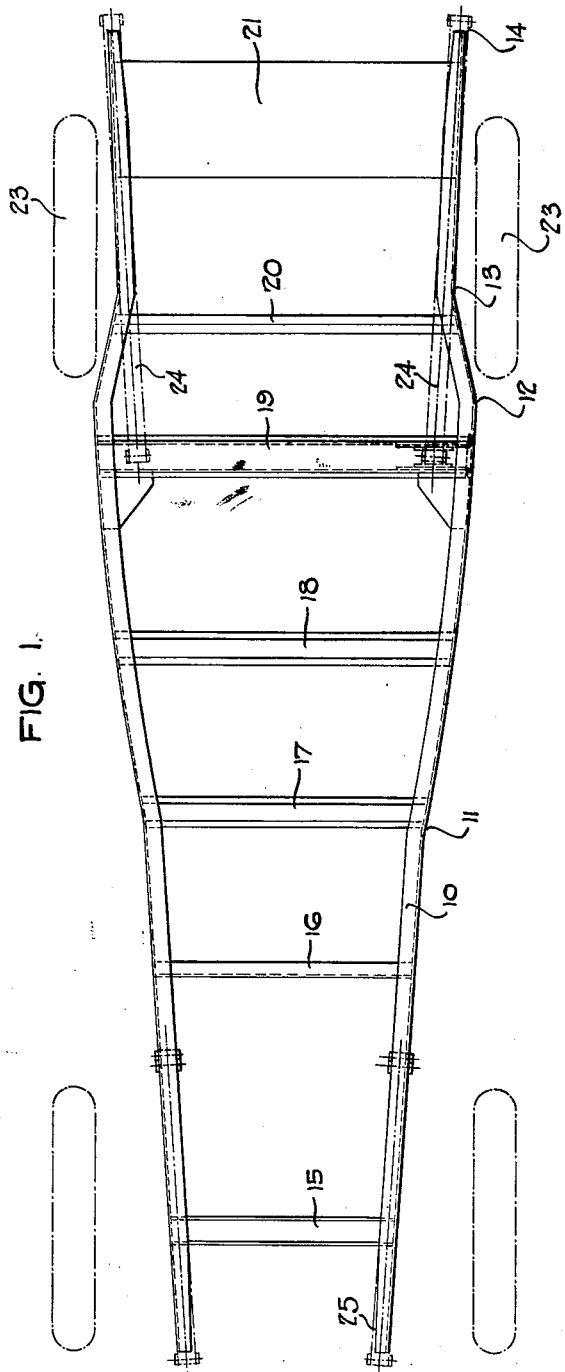
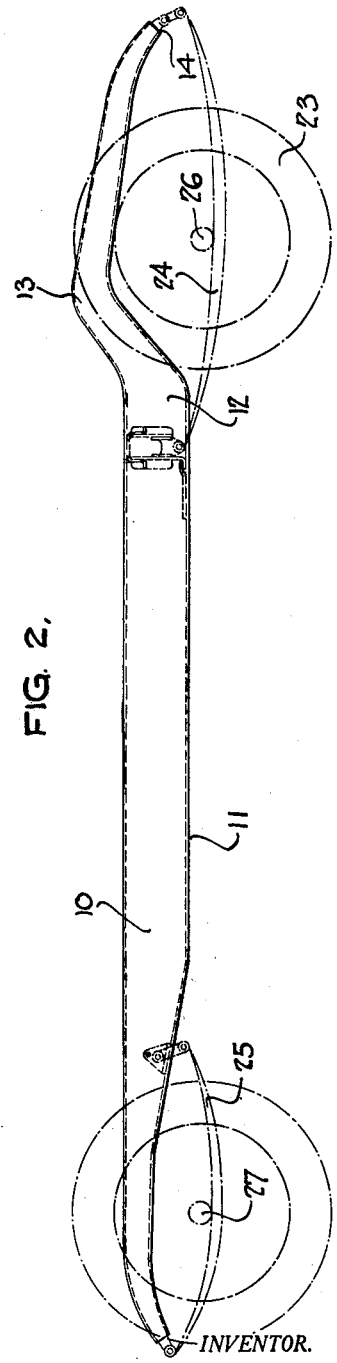
INVENTOR.
JOSEPH LEDWINKA.
BY John P. Barber
ATTORNEY.

Patented June 2, 1931

1,808,502

UNITED STATES PATENT OFFICE

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

CHASSIS CONSTRUCTION

Application filed June 29, 1928. Serial No. 289,138.

The invention relates to chassis construction and particularly to a chassis construction which may serve also as the body underframe.

It is an object of the invention to provide a chassis construction of this class to which the body superstructure may be readily secured and which is of a very strong, sturdy and rigid construction, and which is so related to the running gear and spring suspension thereof, that a car equipped with the improved chassis is characterized by very easy riding qualities.

The objects of my invention are in the main achieved by providing a chassis having side sills of deepened section between the front and rear axles and bulging outwardly between the front and rear wheels to a vertical longitudinal plane adjacent the plane of the wheels, the rear portions of the sills being rather abruptly offset inwardly to provide spaces to receive portions of the rear wheels; and by suspending the rear axle from these rear offset portions of the sills and from a cross brace connecting the sills at a location forwardly of the offset. Other and further objects and advantages will become apparent from the following detailed description when read in connection with the drawings, in which:

Fig. 1 is a plan view of the improved chassis construction, showing the relation of the same to the running gear and spring suspension, Fig. 2 is a side elevation thereof.

In the embodiment of my invention selected for illustration, the side sills 10 of the chassis are shown diverging slightly in their forward portions, say from the extreme front ends of the sills to the regions as at 11 where the front posts of the body adapted to be associated therewith are located when the parts are assembled. From the points 11 rearwardly, the sills bulge outwardly, diverging on a curve preferably an arc of a circle conforming to the lower edge of the body superstructure adapted to be associated therewith to point 12 just forwardly of the rear wheels adjacent the point where the rear door post is located in the case of a sedan body superstructure associated therewith. The sills in this region are bulged outwardly of the chassis substantially to the plane of the wheels. From the points 12 rearwardly, they are rather abruptly offset inwardly by inwardly diverging portions extending from points 12 to points 13 and from the points 13 rearwardly they diverge slightly to their extreme rear ends 14 at angles conforming substantially to the divergence of the forward portions of the sills. The sills so formed are of the usual inwardly facing channel section, but have their intermediate portions vertically deepened, which deepening, together with the bulged shape of the sills in plane and the interconnection by the cross braces, as 15, 16, 17, 18, 19, 20 and 21, provides a very rigid and sturdy chassis structure.

As is clearly shown in the plan view of Fig. 1, the inward offset portions at the rear of the sills provide spaces to receive the inner portions of the rear wheels 23 and the rear springs 24 are arranged just inwardly of the rear wheels and in the plane of the rearmost diverging portions of the sills, the rear ends of the springs being supported by the usual shackles or the like from the rear ends of the sills and the forward ends of the springs extending forwardly of the offset portion and being connected, through brackets 25, to the cross brace 19 interconnecting said sills adjacent their region of greatest outward bulge. The front springs 25 are disposed directly under the rearward diverging forward ends of the sills and secured thereto in any usual manner. The wheel axles 26 and 27 are secured to the springs in any usual manner.

The chassis structure shown and described, by reason of the shape in plan of its sills and their great vertical height between the door openings, is well adapted to have the body superstructure with whose lower side edges it conforms, mounted on and secured directly to the sills to form with the chassis a unitary structure which is exceedingly rigid and strong and, by reason of the abrupt inward offsets at the rear ends provides housings in the chassis sills to receive a portion of the wheels, corresponding housings being, of course, formed in the body superstructure. This arrangement of wheels in the offsets, of the rear springs under the offset portion and in parallel with the front springs provides a relation between chassis sills, springs and wheels which gives to this construction very easy riding qualities, partly due to the low hung construction, partly to the stiffness of the chassis and its outward lateral spread and partly due to the parallel arrangement of the springs. Just what particular circumstance contributes most to this end is not clearly understood, but the fact nevertheless remains that this object of the invention is attained in a very high degree by the construction and arrangement described.

What I claim is:

1. A vehicle chassis construction having side sills bodily bulged-outwardly of the chassis intermediate the front and rear wheels to substantially the plane of the wheels and offset inwardly in their rear portions, whereby to receive the inner portions of the wheels within said offset portions, and springs suspending the rear wheels from the chassis having their rear ends secured to the rear ends of said offset portions of the sills and their forward ends secured to the chassis in said bulged-out region through a direct cross connection joining the bulged-out portions of said sills.

2. A vehicle chassis construction having portions of its side sills bodily bulged-outwardly of the chassis to conform substantially to the lines of the lower edge of the body superstructure to be carried thereby, the greatest distance between the sills being just forward of the rear wheels where the sills extend outwardly adjacent the plane of the wheels, the sills in rear of said location being offset inwardly a substantial distance whereby to provide clearance for the wheels arranged opposite said offset portions, and a unitary cross member connecting the bulged-out portions of said sills.

3. A vehicle chassis construction having portions of its side sills at front and rear diverging outwardly, and intermediate portions bodily bulged-outwardly of the chassis to conform substantially to the lower edge of the body superstructure adapted to be associated therewith and extending outwardly to substantially the planes of the wheels, and springs suspending the chassis from the running gear arranged under said diverging portions of the sills, the rear springs extending forwardly beyond said diverging portions and having their forward ends connected to a cross brace directly joining said bulged-out portions of the sills.

4. A vehicle chassis construction having side sills bodily bulged outwardly of the chassis intermediate the front and rear wheels, a cross bar secured to and connecting said outwardly-bulged portions, and springs suspending the rear wheels from the chassis having their rear ends secured to said sills and their forward ends secured to said cross bar at points substantially longitudinally in line with the rear ends of said sills.

In testimony whereof I hereunto affix my signature.

JOSEPH LEDWINKA.